United States Patent Office 2,781,328
Patented Feb. 12, 1957

2,781,328

PHENOLIC RESIN GLUE COMPOSITIONS CONTAINING HYDROLYZED LIGNO-CELLULOSIC DEGRADATION PRODUCTS

Joseph W. Ayers, Easton, Pa., and John J. Bradley, Jr., Winchester, Mass., assignors to Agrashell, Inc., Los Angeles, Calif., a corporation of Delaware No Drawing. Application May 6, 1953, Serial No. 353,423

11 Claims. (Cl. 260—17.2)

This invention relates to phenolic resin glue compositions containing extender-bodying agents which may be described as chemically modified ligno-cellulosic degradation products derived by the hydrolysis of oat hulls, corn cobs, cotton seed hulls and other like lignocellulosic materials. The preferred degradation products are the residues left from the commercial extraction of pentosans from various agricultural waste products.

An object of the invention is to provide glue compositions of desirable viscosity and stability characteristics utilizing a low cost type of an extender. Another object is to produce plywood of interior grade containing substantial quantities of an extender derived from ligno-cellulosic degradation waste products.

These and other objects of the invention are achieved by providing alkaline phenolic adhesive solutions containing an extender-bodying agent produced by the reaction of a finely divided ligno-cellulosic degradation product of the indicated type, with an alkali metal and with a difficultly soluble alkaline hydroxide. Through this dual alkaline treatment the particles are wholly or in part modified in their chemical content and in their physical properties, and the resulting mass contains various unidentified derivatives apparently including metal-organic complexes or lignates of the polyvalent metals of the hydroxides reacted, the said derivatives being all or at least in substantial part in an insoluble state.

The substances referred to herein as "ligno-cellulosic degradation products," which are modified to provide the extender-bodying agents used in the glue solutions of the invention, are derived by the hydrolysis (either acid or alkaline hydrolysis) of waste agricultural products containing relatively high percentages of pentosans i. e., those capable of providing in industrial processes as much as about 7.5 pounds of furfural per one hundred pounds of agricultural raw material treated.

A preferred degradation product is obtained by the acid hydrolysis of oat hulls, now available in the market. A typical example has the following partial analysis and properties.

Content: Percent
    Cellulose _____ 38
    Lignin _____ 42
Properties:
    Sol. in cold water, 24 hrs_____ 17.36
    Sol. in hot water, 2 hrs_____ 19
    Sol. in 1% NaOH, 1 hr_____ 36.96
    Sol. in 10% $H_2SO_4$, 1 hr_____ 19.81
Particle size distribution:
    Through 100 mesh_____ 99
    Through 200 mesh_____ 95
    Through 325 mesh_____ 90

The "alkali metal" hydroxide used in the production of the new extender, as defined herein is intended to include ammonium hydroxide as well as the hydroxides of the true alkali metals, as sodium and potassium. The difficultly soluble alkaline hydroxide may be the hydroxide of any one or combination of a large number of metals. There may be mentioned, for example, the hydroxides of calcium, barium, magnesium, zinc, copper, lead, iron, cobalt, nickel, aluminum and manganese. These hydroxides have the common function of providing insoluble reaction products in the reaction mass. They may be thought of as insolubilizing reagents, for in their absence the alkali metal hydroxide would produce only soluble derivatives in the reaction mass.

Although these difficultly soluble alkaline compounds are at least theoretically in the form of hydroxides at the time they are reacted, they need not be introduced into the reaction mixture in such form. These reagents can be introduced in the form of their oxides, as for example, lime, and the oxides of barium, zinc, copper, magnesium. The oxides and hydroxides may be referred to collectively as "difficultly soluble hydroxide-providing oxidic compounds."

The amount of the mixture of the two alkaline compounds which can be employed in producing the modified extender varies within wide limits. Although any appreciable amount may produce beneficial results, at least 4% in relation to the amount of the degradation products treated is ordinarily required. The amount of the reagents employed in any particular instance depends upon several factors including the nature of the raw material treated and the use to which the final product is to be put. Since the amount of lignin in the initial materials differs somewhat, the amount of the reagents which can be reacted varies. No absolute limits can be set forth.

Furthermore, the reaction can be carried out in such manner as to effect complete reaction with substantially all of the lignin present or alternatively the conditions can be regulated such that only a superficial reaction on the particles will be obtained. Finally, the reaction may be carried out in such manner that only a part of the degradation products ultimately to be used will be reacted to any substantial extent with the alkaline reagents. In this latter case the reaction may be carried out initially with all or a part of the soluble alkali and a part of the second alkaline reagent and the reaction may be continued to a more or less extent in the presence of a second addition of degradation products and/or reagent. Under one of the procedures it will be seen that unaltered particles will be present in admixture with the modified particles.

The relative proportions as between the two alkaline reagents which can be employed in the operation of the invention, will vary in relation to the desired quality of the bond to be produced in the plywood or glued products formed. It is preferred that the reagents be used in substantially stoichiometric proportions. Under this procedure, the products produced would contain little or no water-soluble derivatives. If the amount of alkali metal hydroxide used is in excess of the equivalent amount, then soluble components may remain in the mass and lead to final coatings and coverings of inadequate weather-resistance. Any excess of soluble components can be removed from the reaction product if desired, as by diluting with water and decanting. A small proportion of these soluble components, however, may serve a desirable function in some aqueous media in which the products can be employed.

If the amount of difficultly soluble alkaline compound used exceeds that of the alkali metal hydroxide, then the final product may contain a quantity of insoluble alkali corresponding more or less to the amount of the excess. In some compositions and glued products the presence of a small amount of lime or other insoluble material may have no ill effect, but the proportion used must be below that which will cause the resin to precipitate or coagulate. The presence of too large an excess will also cause the bonding strength of the glue to decrease.

The reaction of the degradation products with the alkaline reagents may be carried out at any temperature, as from room temperature to boiling. Ordinarily heat in moderate amounts is desirable to speed up the rate of reaction. The reaction may be carried out without applying heat to the reaction mixture, for ordinarily adequately elevated temperatures for quick reaction are obtained by utilizing only autogenous heat or the heat of dissolution of the alkali metal hydroxide and the heat of wetting developed when water is mixed with the finely divided organic material. By the utilization of these sources of heat the reaction mass can be increased in temperature by from 35 to 60 or possibly 70° F. above normal atmospheric temperature dependent on the procedure employed and the quantity of the composition processed in relation to the amount of alkali and water present.

With the temperature increase developed by the reagents, the reaction will proceed adequately in a period of from about 25 to 30 minutes. At higher temperatures the period may be shorter and at lower temperatures the time required is increased.

In an alternative procedure, part of the finely divided degradation products is mixed with the alkali metal hydroxide and heated to a higher temperature, as from 160° F. to boiling, after which the reaction mass is permitted to cool somewhat whereupon the difficultly soluble alkaline oxidic compound together with the remainder of the organic material is added. In this reaction the soluble hydroxide can be made to react with most, if not all, of the lignin present in the part of the raw material treated and the presence of the reaction product in solution in the mass will provide a composition of very high viscosity. The lime or other difficultly soluble alkaline reagent added to this treated material reacts with the solubilized components apparently made up in part of sodium lignate and forms insoluble compounds in a mass in which the unreacted or only slightly reacted additional regradation products serve at least two functions, namely, as a sealer which prevents excessive penetration when the composition is applied on porous surfaces and as a cost reducer in lessening the amount of more expensive components required.

The phenolic materials of the glue compositions of the invention are thermosetting resins of the type suitable for laminating purposes and are referred to in industry as "phenolic resin adhesives." Most commonly, such products constitute alkaline colloidal solutions or aqueous emulsions having from about 42 to 50% resin solids. The resins most generally used in glue compositions and preferred in the present compositions are those resulting from the reaction of alkali catalyzed solutions of phenol and formaldehyde having a pH from about 9.5 to 12. It is also contemplated that phenol-aldehyde resins as are obtained by the reaction of cresol or other substituted phenols with formaldehyde and other aldehydes such as acetaldehyde and paraformaldehyde be used. The resin may be employed in the form of an alcoholic solution or as an aqueous solution, such compositions being known in the art.

A suitable phenolic resin may be produced for example, by reacting 1 mol of phenol with 2 mols of formaldehyde in the presence of sodium hydroxide in an amount of about 3% based on the weight of the phenol, the reaction being carried out at 85 to 100° C. until the proper viscosity is obtained, after which the resulting reaction solution is diluted with a solution of sodium hydroxide to yield a product of about 50% solids, this product being compatible with water and convertible into a hard insoluble product when heated to a temperature about 100° C.

The modified degradation product materials herein described constitute excellent extender-bodying agents for these phenolic resin adhesives used particularly in plywood manufacture. Tests have shown that these modified organic materials when mixed with resin glue solutions provide plywood ahesive compositions of increased true viscosity usually also having thixotropic properties both of which properties provide superior action on the spreading rolls.

Glue compositions capable of producing good quality interior grade plywood are obtainable by reacting up to 50 parts of the degradation product with up to 12 parts of each of the two alkaline hydroxides in an aqueous medium containing as much as 140 parts or more of water.

The viscosity and thixotropic properties of the adhesive compositions of the present invention can be altered or controlled to some extent by an adjustment of the amount of soluble components, presumably sodium lignate, in the modified degradation product or in the adhesive composition containing the same. If the modified degradation product contains excess soluble components they can be removed therefrom by dilution with water and decanting. On the other hand if improved viscosity or thixotropic properties are desired in the glue compositions a small percentage of sodium lignates may be added thereto.

In the examples to follow, a low viscosity phenolic resin adhesive and a high viscosity phenolic resin adhesive of the conventional types were employed, the same being identifiable by the properties set forth in the accompanying table:

|  | Resin A | Resin B |
|---|---|---|
| Percent solids | 41.6 | 49.4 |
| Viscosity (G & H) | F | X |
| pH at 25° C | 11.85 | 11.1 |
| Water tolerance, percent, at 25° C | Infinite | 800 |

*Example 1*

One hundred parts of phenolic resin A were added to a batch of modified degradation products prepared by the following procedure:

Twenty parts of commercial degradation products of oat hulls were first wetted by mixing with sufficient water to provide a slurry, for 5 to 10 minutes. Then a freshly prepared 15–30% solution of sodium hydroxide in an amount of 3.85 parts alkali containing an equal amount of calcium hydroxide dispersed therethrough was added to the wetted degradation products and the whole mixed for about 25 to 30 minutes. The total amount of water present was 60 parts.

*Example 2*

The foregoing process was repeated except that phenolic resin B was substituted for resin A, in like amount.

*Example 3*

A glue composition was prepared by mixing 100 parts of phenolic resin B for 25 to 30 minutes with an extender-bodying agent produced by dry mixing 50 parts of the same ligno-cellulose degradation product with 7.7 parts of sodium hydroxide and 7.7 parts of calcium oxide for ten minutes, adding 110 parts of water, mixing for 30 minutes, adding 30 parts of water to cool the mass and stirring for 5 to 10 minutes until a uniform mass is obtained.

The glue compositions described herein are suitable for the production of plywood in accordance with conventional commercial procedures using normal press temperatures of 280 to 310° F. and pressures of 200 to 250 pounds per sq. inch. The reaction will advance rapidly during 1 to 6 minute pressing cycles.

To test the compositions of the examples, the glues were spread by means of a mechanical roll spreader, at about equal weights, double glue line on one-eighth inch veneer for producing 3 ply plywoods. Assembly times were thirty minutes, pressing time 3 minutes at 300° F.

under pressure of 200 pounds per square inch, followed by a post cure at about 120° F. for eight hours.

The comparative results of the plywood samples were as follows:

| Example | 1 | 2 | 3 |
|---|---|---|---|
| Resin A | 100 | | |
| Resin B | | 100 | 100 |
| Degradation residue | 20 | 20 | 50 |
| NaOH | 3.85 | 3.85 | 7.7 |
| CaO | 3.85 | 3.85 | 7.7 |
| Water-in-mix | 60 | 50 | 140 |
| Adhesive viscosity, cp.: | | | |
| Fresh | 16,200 | 34,400 | 26,400 |
| 30 min. on roll | 19,200 | 84,000 | 32,000 |
| Aged 18 hrs | 16,800 | 52,000 | 49,000 |
| Shear, p. s. i., dry | 340 | 318 | 342 |
| Wood failure, dry | 87 | 91 | 90 |
| Adhesive spread, lbs./M sq. ft | 47 | 49 | 49 |
| Temp. increase | 43 | 44 | 57 |

From the tests recorded in the foregoing table, it will be observed that good quality plywood for interior use was produced particularly when resin B was employed and even when the extender-bodying agent was present in a large proportion.

The glue compositions of the present invention have increased viscosities and they may be thixotropic, and hence can be applied well on fast operating spreading rolls. Ligno-cellulosic degradation products can be successfully used in larger quantities through the chemical modification procedure herein described.

It should be understood that the invention is not limited to the specific details herein set out, for it extends to all equivalent materials and procedures which will occur to those skilled in the art upon consideration of the terms and scope of the claims appended hereto.

We claim:

1. A glue composition comprising an alkaline phenolic-aldehyde resin adhesive solution containing as an extender-bodying agent a finely divided hydrolyzed ligno-cellulosic degradation product the lignin content of which has at least in substantial part been modified by reaction with an alkali metal hydroxide and with a difficultly water-soluble alkaline hydroxide, the latter being employed in an amount which insolubilizes at least a substantial part of the product solubilized by the alkaline metal hydroxide.

2. A glue composition comprising an alkaline phenolic-aldehyde resin adhesive solution containing as an extender-bodying agent a substantially water-insoluble reaction mixture obtained by reacting a finely divided ligno-cellulosic degradation hydrolysate with an alkali metal hydroxide and with a difficultly water-soluble alkaline hydroxide, thereby modifying at least a substantial part of the lignin content to provide the lignin content ultimately in an insoluble state.

3. A glue composition comprising an alkaline phenolic-aldehyde resin adhesive solution containing as an extender-bodying agent a finely divided ligno-cellulosic hydrolytic degradation product the lignin content of which has at least in substantial part been modified by reaction with an alkali metal hydroxide and with a difficultly water-soluble alkaline hydroxide, the hydroxides being used in substantially equivalent amounts.

4. A glue composition comprising an alkaline phenol-formaldehyde resin aqueous emulsion containing as an extender-bodying agent a finely divided water-insoluble ligno-cellulosic degradation product the lignin content of which has at least in substantial part been modified by reaction with an alkali metal hydroxide and with a difficultly water-soluble alkaline hydroxide.

5. A thixotropic glue composition for bonding laminates comprising an alkaline phenolic-aldehyde resin adhesive solution containing as an extender-bodying agent a finely divided ligno-cellulosic degradation product derived from oat hulls the lignin content of which has at least in substantial part been modified by reaction with sodium hydroxide and with a difficultly water-soluble alkaline hydroxide, the latter being used in a proportion which substantially insolubilizes the lignin content solubilized by the action of the sodium hydroxide.

6. A thixotropic glue composition for bonding laminates comprising an alkaline phenolic-aldehyde resin adhesive solution containing as an extender-bodying agent a finely divided ligno-cellulosic degradation product derived from oat hulls the lignin content of which has at least in substantial part been modified by reaction with sodium hydroxide and with calcium hydroxide, said agent being substantially free of water-soluble reaction products.

7. A thixotropic glue composition for bonding laminates comprising an alkaline phenolic-aldehyde resin adhesive solution containing as an extender-bodying agent a substantially water-insoluble reaction mixture obtained by reacting a finely divided ligno-cellulosic hydrolytic degradation product with sodium hydroxide and with calcium hydroxide.

8. A glue composition comprising an alkaline phenolic-aldehyde resin adhesive solution containing as an extender-bodying agent a hydrolysis degradation product of oat hulls the lignin content of which has at least in substantial part been modified by reaction with an alkali metal hydroxide and with a difficultly water-soluble alkaline hydroxide, the latter being employed in an amount which insolubilizes at least a substantial part of the product solubilized by the alkali metal hydroxide.

9. A glue composition comprising an alkaline phenolic-aldehyde resin adhesive solution containing as an extender-bodying agent an acid hydrolysis degradation product of an agricultural waste, ligno-cellulose material the lignin content of which has at least in substantial part been modified by reaction with an alkali metal hydroxide and with a difficultly water-soluble alkaline hydroxide, the latter being employed in an amount which insolubilizes at least a substantial part of the product solubilized by the alkaline metal hydroxide.

10. A glue composition comprising an alkaline phenolic-aldehyde resin adhesive solution containing as an extender-bodying agent an acid hydrolysis degradation residue of oat hulls the lignin content of which has at least in substantial part been modified by reaction with an alkali metal hydroxide and with a difficultly water-soluble alkaline hydroxide, the latter being employed in an amount which insolubilizes at least a substantial part of the product solubilized by the alkaline metal hydroxide.

11. An adhesive solution comprising a plywood glue composed of an aqueous alkaline phenolic-aldehyde resin solution containing in the solution as an extender bodying agent, a finely divided substantially water-insoluble hydrolytic degradation product of a lignocellulosic agricultural waste material the lignin content of which has at least in substantial part been modified by reaction with an alkali metal hydroxide and with a difficultly water-soluble alkaline hydroxide.

References Cited in the file of this patent

UNITED STATES PATENTS

| 1,941,059 | Steele et al. | Dec. 26, 1933 |
| 2,507,465 | Ayers | May 9, 1950 |
| 2,574,785 | Heritage | Nov. 13, 1951 |
| 2,727,869 | Ash et al. | Dec. 20, 1955 |

OTHER REFERENCES

Clark et al.: Modern Plastics, October 1945, pages 158 to 160.